US010572199B2

(12) United States Patent
Kawakami et al.

(10) Patent No.: US 10,572,199 B2
(45) Date of Patent: Feb. 25, 2020

(54) PRINTING APPARATUS CONFIGURED TO IMPLEMENT A PREDETERMINED INTERVAL FOR COMMUNICATION REQUESTS

(71) Applicant: SEIKO EPSON CORPORATION, Tokyo (JP)

(72) Inventors: Tatsuya Kawakami, Ueda (JP); Kei Watanabe, Saku (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/045,913

(22) Filed: Jul. 26, 2018

(65) Prior Publication Data
US 2019/0034134 A1 Jan. 31, 2019

(30) Foreign Application Priority Data
Jul. 27, 2017 (JP) .................................. 2017-145625

(51) Int. Cl.
G06F 3/12 (2006.01)
H04W 52/02 (2009.01)

(52) U.S. Cl.
CPC .......... *G06F 3/1221* (2013.01); *G06F 3/1229* (2013.01); *G06F 3/1284* (2013.01); *H04W 52/0216* (2013.01); *H04W 52/0251* (2013.01); *G06F 3/1292* (2013.01)

(58) Field of Classification Search
CPC . G06F 3/1221; G06F 3/1229; H04W 52/0251
See application file for complete search history.

(56) References Cited

U.S. PATENT DOCUMENTS

| | | | | |
|---|---|---|---|---|
| 5,924,802 A * | 7/1999 | Sakurai | .................. | G06F 3/1204 400/61 |
| 9,124,731 B2 * | 9/2015 | Hirai | .................. | H04N 1/00204 |
| 2012/0072617 A1 * | 3/2012 | Miyasaka | ............. | G06F 13/387 710/17 |
| 2014/0204412 A1 * | 7/2014 | Pizot | ..................... | G06F 3/1296 358/1.15 |
| 2016/0282906 A1 * | 9/2016 | Haga | ..................... | G06F 1/1632 |
| 2016/0352947 A1 * | 12/2016 | Chiba | ................ | G06K 15/4055 |
| 2017/0085456 A1 * | 3/2017 | Whitner | .................. | H04L 43/08 |

(Continued)

FOREIGN PATENT DOCUMENTS
JP 2010-011423 A 1/2010

*Primary Examiner* — Benjamin O Dulaney
(74) *Attorney, Agent, or Firm* — Foley & Lardner LLP

(57) ABSTRACT

A printer includes a printing mechanism, a printer BLT communicator, a printer device communicator capable of communicating with a customer display, and a printer processor for performing printing based on print data in a case where the print data is received and transmits display data to the customer display in a case where the display data is received, in which the printer processor temporarily stops wireless communication by shifting an operation mode of the printer BLT communicator to a Sniff mode to transmit a communication request to the POS terminal device at a communication request interval in a case where a period during which the print data or the display data is not received exceeds a shift period, and changes the communication request interval depending on whether or not the customer display is connected.

12 Claims, 7 Drawing Sheets

(56) References Cited

U.S. PATENT DOCUMENTS

2017/0230524 A1* 8/2017 Kawaguchi ........ H04N 1/00891
2017/0281060 A1* 10/2017 Wedekind ............ A61B 5/0022
2018/0040207 A1* 2/2018 Kobayashi ............ G06F 9/4411
2018/0075721 A1* 3/2018 Oliver ..................... H04W 4/70

* cited by examiner

|  | F1 | | F2 | |  |
| --- | --- | --- | --- | --- | --- |
|  | CONNECTED | | NOT CONNECTED | | |
| REQUEST INTERVAL SETTING ITEM | 15 ms | | 250 ms | | ← R1 |
| SHIFT PERIOD SETTING ITEM | 255 s | | 1 s | | ← R2 |
| TYPE SETTING ITEM | SNIFF | PASSIVE | SNIFF | PASSIVE | ← R3 |

PRINTING APPARATUS CONFIGURED TO IMPLEMENT A PREDETERMINED INTERVAL FOR COMMUNICATION REQUESTS

CROSS REFERENCES TO RELATED APPLICATIONS

The present application claims priority based on Japanese Patent Application No. 2017-145625, filed on Jul. 27, 2017, which is incorporated by reference in its entirety.

BACKGROUND

1. Technical Field

The present invention relates to a printing apparatus and a method of controlling the printing apparatus.

2. Related Art

Up to now, a technique for controlling power saving in a wireless communication system has been known (for example, see JP-A-2010-11423). JP-A-2010-11423 discloses a wireless communication system in which a control device (wireless transmitter) switches a power saving mode (sleep mode) for suppressing power consumption depending on an error generated in a printing apparatus, and a time required for the printing apparatus to start printing again when the error is canceled is shortened and power consumption of the control device is suppressed.

When it is configured so that wireless communication with a control device is possible, it may be desired to restrict the wireless communication with the control device in order to reduce power consumption even on the printing apparatus side. Here, when an external device is connected to the printing apparatus, while performing power saving control for suppressing power consumption, it is necessary to transmit data received from the control device to the external device, and to quickly control the external device. However, JP-A-2010-11423 does not disclose such control.

SUMMARY

An advantage of some aspects of the invention is to control power saving and to control an external device depending on a connection to the external device to be performed appropriately.

In order to solve the above-mentioned problem, the printing apparatus, to which some aspects of the invention is applied, includes a printing mechanism, a first communicator capable of wireless communication with a computer, a second communicator capable of communicating with an external device, and a processor which performs printing using the printing mechanism depending on first data when the first communicator receives the first data from the computer and transmits second data to the external device using the second communicator when the first communicator receives the second data from the computer (the second communicator being connected to the external device). The processor temporarily stops wireless communication by shifting to a power saving mode from an operation mode of the first communicator and transmits a communication request to the computer at a predetermined interval when a period during which the first communicator does not receive the first data or the second data exceeds a predetermined period, and changes the predetermined interval depending on whether or not the external device is connected to the second communicator.

According to this configuration, since the predetermined interval of the communication request is changed depending on whether or not the external device is connected to the second communicator, it is possible to appropriately perform the power saving control and the external device control according to the connection of the external device.

In addition, in the above-described printing apparatus, the processor sets the predetermined interval when the external device is connected to the second communicator shorter than the predetermined interval when the external device is not connected to the second communicator.

According to this configuration, the predetermined interval of the communication request when the external device is connected to the second communicator is shorter than the predetermined interval when the external device is not connected, therefore, when the external device is connected, the external device can be quickly controlled, and when the external device is not connected, it is possible to perform the power saving control with emphasis on suppressing the power consumption.

In addition, in the above-described printing apparatus, the processor changes the predetermined period for shifting to the power saving mode depending on whether or not the external device is connected to the second communicator.

According to this configuration, since the predetermined period for shifting to the power saving mode is changed depending on whether or not the external device is connected to the second communicator, the power saving control and the external device control can be appropriately performed according to the connection of the external device.

In addition, in the above-described printing apparatus, the processor sets the predetermined period when the external device is connected to the second communicator longer than the predetermined period when the external device is not connected to the second communicator.

According to this configuration, since the predetermined period for shifting to the power saving mode when the external device is connected to the second communicator is made longer than the predetermined period when the external device is not connected, it is possible to quickly control the external device when the external device is connected and to quickly shift to the power saving mode when the external device is not connected.

In addition, in the above-described printing apparatus, when the external device is connected to the second communicator, the processor alternately performs printing by the printing mechanism based on the first data and transmission of the second data by the second communicator.

According to this configuration, even when the printing based on the first data and the transmission of the second data are alternately performed, it is possible to suppress the occurrence of a delay in the printing and the control of the external device.

Further, in the above-described printing apparatus, the computer is a POS terminal for performing accounting processing, the external device is a display for displaying information related to accounting, the first data is a print data related to issuing a receipt, the second data is a display data including information relating to the accounting displayed by the display, and the processor issues a receipt by the printing mechanism when the first communicator receives the print data from the POS terminal, and the second communicator transmits information related to the accounting to the display for display when the first communicator receives the display data from the POS terminal (the second communicator being connected to the display).

According to this configuration, it is possible to appropriately perform the power saving control and the display of the information related to the accounting of the display according to the connection of the display.

In order to solve the above-mentioned problem, the control method of the printing apparatus, to which some aspects of the invention is applied, includes a printing mechanism, a first communicator capable of wireless communication with the processor, a second communicator capable of communicating with an external device, and a processor which performs printing using the printing mechanism in accordance with first data when the first communicator receives the first data from the computer and transmits second data to the external device using the second communicator when the first communicator receives the second data from the computer (the second communicator being connected to the external device). The processor temporarily stops wireless communication by shifting an operation mode of the first communicator to a power saving mode and transmits a communication request to the computer and changes a predetermined interval depending on whether or not the external device is connected to the second communicator when a period during which the first communicator does not receive the first data or the second data exceeds a predetermined period.

According to this configuration, since the predetermined interval of the communication request is changed depending on whether or not the external device is connected to the second communicator, it is possible to appropriately perform the power saving control and the external device control according to the connection of the external device.

BRIEF DESCRIPTION OF THE DRAWINGS

The one embodiment will be described with reference to the accompanying drawings, wherein like numbers reference like elements.

FIG. 4 is a diagram showing an example of a setting value table.

DESCRIPTION OF EXEMPLARY EMBODIMENTS

Figure 1:
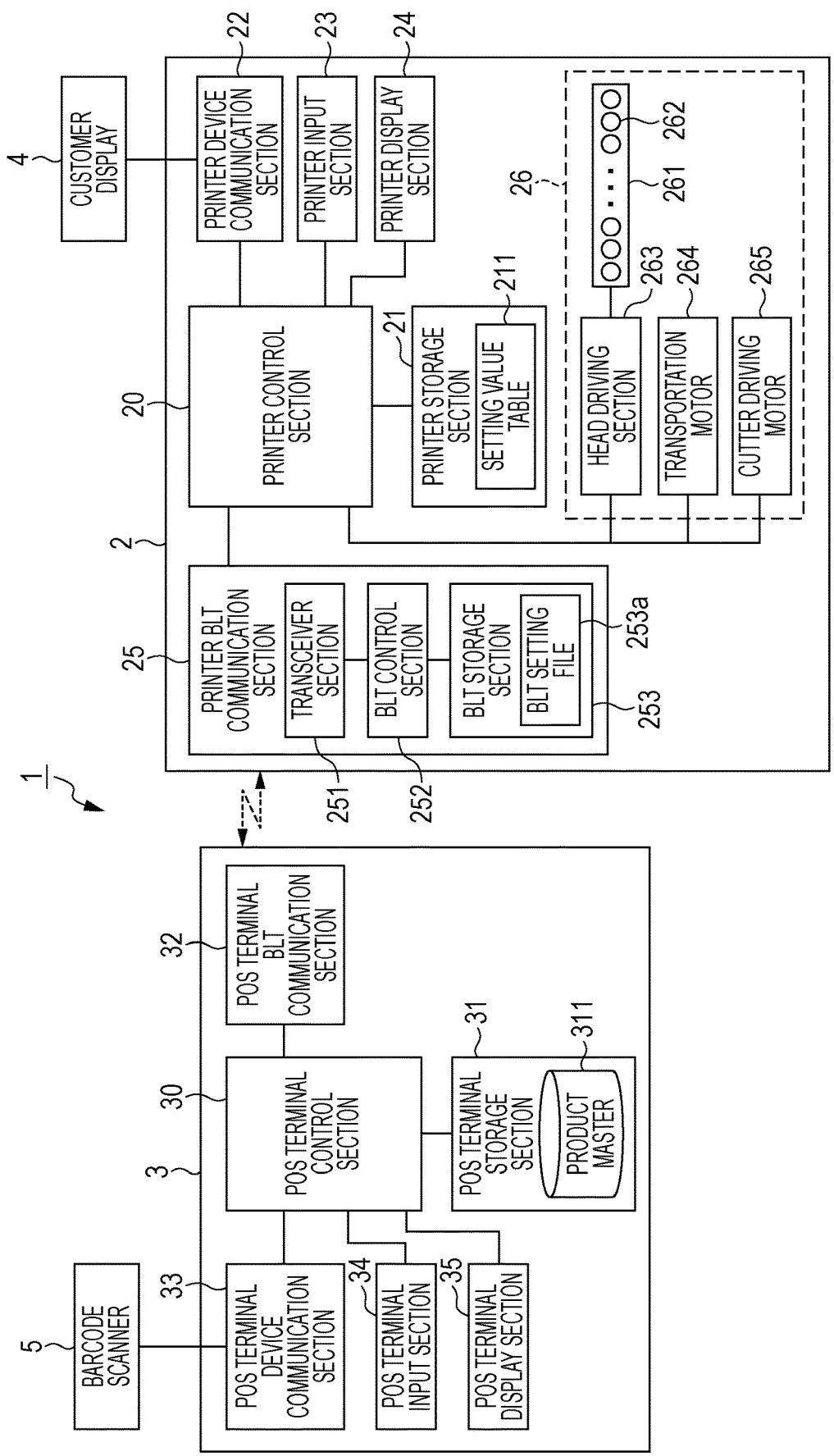
FIG. 1 is a diagram showing a configuration of a POS system.

FIG. 1 is a diagram showing a configuration of a Point Of Sale (POS) system 1.

The POS system 1 is a system which is applied to retail businesses such as a shopping mall, a department store, a convenience store, in-vehicle sales, and the like, and food and drink businesses such as a restaurant, a coffee shop, a pub, and the like. The POS system 1 has a function of performing accounting according to products purchased by a customer, a function of printing a receipt according to the accounting, and the like.

As shown in FIG. 1, the POS system 1 includes a printer 2 (printing apparatus), a POS terminal device 3 (control device, host computer), a customer display 4 (external device, external apparatus, display device, data output device, data output apparatus, data receiving device, data receiving apparatus, data receiver), and a barcode scanner 5.

The printer 2 is a device for printing characters, images, and the like on a print medium based on print data received from the POS terminal device 3. In the printer 2 according to this embodiment, a thermal roll paper (not shown) is stored as a print medium in a main body, and heat is applied to a print surface of the thermal roll paper by a line thermal head 261 having a large number of heating elements 262, whereby characters, images, and the like are printed. In addition, in the POS system 1, the printer 2 according to this embodiment, issues a receipt, which indicates a result of the accounting processing performed by the POS terminal device 3, by printing characters, images, and the like on the thermal roll paper based on the print data received from the POS terminal device 3.

The POS terminal device 3 is a device that communicates with the printer 2 and controls the printer 2, and, for example, is a terminal device such as a smartphone or a tablet terminal, that can be carried by a user, and is a computer that is installed at a register (accounting) counter of a store. The user is, for example, a register cashier of a register counter provided in a store. In accordance with an accounting performed by the POS system 1, the POS terminal device 3 according to this embodiment performs accounting processing accompanying sales of a product, and causes the printer 2 to issue a receipt based on the accounting processing. The receipt issued by the printer 2 is handed to a customer from the register cashier, for example.

The customer display 4 is a display device such as a liquid crystal display, and is externally connected to the printer 2. The customer display 4 displays various kinds of information under the control of a printer control section (processor) 20 of the printer 2. According to this embodiment, the customer display 4 of the POS system 1, displays information related to the accounting such as a product name, a unit price of the product, a total amount of money, and the like (hereinafter, referred to as "accounting information") for the product purchased by the customer. The accounting information displayed on the customer display 4 can be viewed by the customer who performs the accounting.

The barcode scanner 5 reads a barcode attached to the product, packaging of the product, and the like, and outputs data indicating a read result to the POS terminal device 3.

The printer 2 includes the printer control section 20 (control section, processor), a printer storage section 21 (printer memory), a printer device communication section 22 (second communication section, second communicator, second communicator, second communication board, second communication circuit, second communication port, second communication connecter), a printer input section 23 (switch, sensor), a printer display section 24 (display), a printer BLT communication section 25 (first communication section, first communicator, first communicator, first communication board, first communication circuit, first communication port, first communication connecter), and a printing section 26 (printing mechanism). Note that BLT indicates Bluetooth (registered trademark) in this embodiment.

The printer control section 20 includes a CPU (processor), a ROM, a RAM, an ASIC, a signal processing circuit, and the like, and controls each section of the printer 2. For example, the CPU of the printer control section 20 reads out a program such as firmware stored in the ROM, the printer storage section 21, and the like to the RAM, performs the processing, and controls each section in the printer 2.

Further, processing is performed by a cooperative work of hardware and software, for example, processing is performed by a function implemented in an ASIC, and processing is performed by performing signal processing, for example, in a signal processing circuit.

The printer storage section 21 includes a non-volatile memory such as a hard disk or an EEPROM, and stores various data in a rewritable manner. The printer storage section 21 stores a setting value table 211. The setting value table 211 will be described later.

The printer device communication section 22 includes an interface board having, for example, a port conforming to a USB standard, a port conforming to a serial communication standard other than the USB, and a port conforming to other communication standards. The printer device communication section 22 communicates with the device connected to the port under the control of the printer control section 20. In this embodiment, the customer display 4 is connected as a device, and the printer device communication section 22 communicates with the customer display 4 under the control of the printer control section 20.

The printer input section 23 includes an input unit such as an operation panel (switch) or a touch panel (sensor) provided in the printer 2, detects an operation made by the user to the input unit, and outputs the detected operation to the printer control section 20. Based on an input from the printer input section 23, the printer control section 20 performs a processing corresponding to the operation on the input unit.

The printer display section 24 includes a plurality of LEDs, a display panel, and the like, and performs lighting, flashing, turning on/off of the LEDs in a predetermined manner and display of information on the display panel, and the like, under the control of the printer control section 20.

The printer BLT communication section 25 wirelessly communicates with the POS terminal device 3 conforming to the Bluetooth standard under the control of the printer control section 20. As shown in FIG. 1, the printer BLT communication section 25 includes a transceiver section 251 (transceiver and receiver), a BLT control section 252, and a BLT storage section 253 (memory).

The transceiver section 251 receives a radio signal according to a predetermined communication frequency, demodulates the received radio signal into a baseband signal, and performs a process of modulating the baseband signal and communicating it as a radio signal in accordance with a predetermined communication frequency.

The BLT control section 252 includes a CPU (processor) and the like, and reads out and executes a program such as firmware from the BLT storage section 253, and controls each portion of the printer BLT communication section 25. For example, the BLT control section 252 performs baseband processing for generating the baseband signal from data to be transmitted to the POS terminal device 3 or acquiring data from the baseband signal acquired from the transceiver section 251, and interface processing, and the like, with the printer control section 20.

The BLT storage section 253 includes a non-volatile memory such as a hard disk or an EEPROM, and stores various data in a rewritable manner. For example, the BLT storage section 253 stores software for the BLT control section 252 to perform the function of a link management layer, software for executing the interface process with the printer control section 20, and the like. Note that the link management layer is a protocol which is defined on a baseband layer as a protocol for transmitting and receiving packets on a communication link, and provides various control functions relating to the communication link such as setting and disconnection of the communication link provided by the baseband layer.

Further, the BLT storage section 253 stores a BLT setting file 253a.

The BLT setting file 253a stores a combination of setting items relating to setting of wireless communication conforming to the Bluetooth standard and setting values corresponding to the setting items. In this embodiment, the setting items relating to the setting of the wireless communication conforming to the Bluetooth standard includes at least a setting item relating to the setting of the type of the power saving mode among the operation modes of the printer BLT communication section 25, a setting item relating to the setting of the shift period (predetermined period) to the power saving mode, and a setting item relating to the setting of the communication request interval (predetermined interval) required for the printer BLT communication section 25 to request communication request to the POS terminal device 3 during the power saving mode.

In the following description, the setting item relating to the setting of the type of the power saving mode is expressed as a type setting item, the setting item relating to the setting of the shift period to the power saving mode is expressed as a shift period setting item, and the setting item related to the setting of the communication request interval is expressed as a request interval setting item.

Note that, in this embodiment, when it is expressed that the setting is set as the BLT setting file 253a, the setting value is set as a predetermined setting item of the BLT setting file 253a.

The printing section 26 includes a line thermal head 261, a head driving section 263 (head driver), a transportation motor 264 (transportation mechanism), and a cutter driving motor 265 (cutter).

In the line thermal head 261, the plurality of heating elements 262 composed of resistors are arranged in a direction crossing (e.g., perpendicular to) the transportation direction of the thermal roll paper and in a plurality of rows. The line thermal head 261 generates heat by energizing the heating elements 262, applies heat to a printing surface of a thermal roll paper, and prints characters, images, and the like.

The head driving section 263 controls the energization of the heating elements 262 of the line thermal head 261 under the control of the printer control section 20.

Under the control of the printer control section 20, the transportation motor 264 rotates a transportation roller (not shown) and conveys the thermal roll paper.

Under the control of the printer control section 20, the cutter driving motor 265 drives a movable blade (not shown) to slide toward a fixed blade (not shown), and cuts the thermal roll paper.

Next, the POS terminal device 3 will be described.

The POS terminal device 3 includes a POS terminal control section 30, a POS terminal storage section 31, a POS terminal BLT communication section 32, a POS terminal device communication section 33, a POS terminal input section 34, and a POS terminal display section 35.

The POS terminal control section 30 includes a CPU (processor), a ROM, a RAM, an ASIC, a signal processing circuit, and the like, and controls each section of the POS terminal device 3. The POS terminal control section 30 performs processing in cooperation with hardware and software. For example, the CPU reads out a program such as a POS application stored in the ROM, the POS terminal storage section 31, or the like, into the RAM for performing the processing, or, for example, processes are performed by the functions implemented in the ASIC, or for example, the signal processing circuit performs signal processing for performing the processing, or the like.

The POS terminal storage section 31 includes a non-volatile memory such as a hard disk or an EEPROM, and stores various data in a rewritable manner. Further, the POS terminal storage section 31 stores a product master 311. The product master 311 is a database that stores a product code of a product, the product name, a unit price of the product, and other information on the product (hereinafter, referred to as "product information") in association with one another, for example, for a product sold at a store.

The POS terminal BLT communication section 32 (transceiver and receiver) has the same configuration as that of the printer BLT communication section 25, and wirelessly communicates with the printer 2 conforming to a Bluetooth standard under the control of the POS terminal control section 30.

The POS terminal device communication section 33 (transceiver and receiver) includes an interface board including, for example, a port conforming to the USB standard, a port conforming to the serial communication standard other than USB, and a port conforming to the other communication standards. The POS terminal device communication section 33 communicates with the device connected to the port under the control of the POS terminal control section 30. In this embodiment, the barcode scanner 5 is connected as a device, and the POS terminal device communication section 33 communicates with the barcode scanner 5 under the control of the POS terminal control section 30. Incidentally, the POS terminal device communication section 33 is configured to perform wireless communication conforming to a wireless communication standard and may wirelessly communicate with the device.

The POS terminal input section 34 includes an input unit such as an operation panel or a touch panel provided on the POS terminal device 3, detects an operation on the input unit made by a user, and outputs the detected operation to the POS terminal control section 30. Based on an input from the POS terminal input section 34, the POS terminal control section 30 performs a processing corresponding to the operation on the input unit.

The POS terminal display section 35 includes a plurality of LEDs, a display panel, and the like, and performs lighting, blinking, turning on/off of the LEDs in a predetermined manner and display of information on the display panel, and the like, under the control of the POS terminal control section 30.

Next, a basic operation of the POS terminal device 3 and the printer 2 when accounting is performed at a register counter of a store, for example, will be described.

For example, assume that a register cashier in a store reads a barcode attached to a product purchased by a customer using the barcode scanner 5, and the barcode scanner 5 outputs a product code to the POS terminal device 3. Then, the POS terminal control section 30 of the POS terminal device 3 receives the product code using the POS terminal device communication section 33, and acquires the product information of the product corresponding to the received product code by referring to the product master 311 stored in the POS terminal storage section 31. Note that the product information includes at least information indicating a product name and information indicating a unit price of the product which is being attached with a barcode read by the barcode scanner 5.

Based on the acquired product information, the POS terminal control section 30 generates print data (first data) to be printed on the thermal roll paper on the basis of the characters such as the product name and the unit price of the product read by the barcode scanner 5. Note that the print data is the print data relating to the issuance of a receipt. Further, the POS terminal control section 30 acquires the product information and the sub-total (current total amount) of the product read by the barcode scanner 5, and generates the display data (second data) to be displayed on the customer display 4. When the POS terminal control section 30 generates the print data and the display data, the POS terminal control section 30 transmits the print data and the display data generated by the POS terminal BLT communication section 32 to the printer 2.

When the printer BLT communication section 25 receives the print data from the POS terminal device 3, the printer control section 20 of the printer 2 controls the printing section 26 based on the print data, and prints the product information such as the product name and the unit price of the product on the thermal roll paper. Further, in the printer control section 20, when the printer BLT communication section 25 receives the display data from the POS terminal device 3, the printer device communication section 22 transmits the received display data to the customer display 4. The printer control section 20 alternately performs printing, based on the print data, and the transmission of the display data each time the barcode scanner 5 reads the barcode.

Upon receipt of the display data, the customer display 4 displays product information such as the product name and the unit price of the product. Note that the product information displayed by the customer display 4 is the product information of the product to be paid by the customer, and thus corresponds to the accounting information.

As described above, when the barcode attached to the product is read by the barcode scanner 5 by the register cashier, the printer 2 prints the product information of the product being read by the barcode scanner 5 and displays the product information on the customer display 4. This operation is performed each time the barcode is read by the barcode scanner 5. The customer can visually view at least the product name and the unit price of the product by the customer display 4 when the register cashier uses the barcode scanner 5 to read the barcode attached to the product.

Here, assume that the register cashier has completed the processing of the product to be purchased by the customer and performs an operation of confirming the accounting. When the POS terminal control section 30 detects an operation for confirming an accounting by the POS terminal input section 34, a total amount of money is calculated based on the product information corresponding to one or a plurality of product codes read by the barcode scanner 5 so far, money is received from the customer, a change is calculated, and accounting processing is performed, and the like.

When an accounting processing is performed, the POS terminal control section 30 generates print data (first data) to be printed on the thermal roll paper based on the total amount of money, characters such as a deposit, a change, and the like, and generates display data (second data) for displaying the total amount of money, the money received, the change, and the like on the customer display 4. Note that this print data is also print data related to issuance of a receipt. After generating the print data and the display data, the POS terminal control section 30 transmits the print data and the display data to the printer 2 by the POS terminal BLT communication section 32.

In the printer control section 20 of the printer 2, when the printer BLT communication section 25 receives the print data after the accounting processing from the POS terminal device 3, the information, such as the total amount of money, the money received, the change, and the like, is printed on the thermal roll paper on the basis of the print data by the printing section 26. At this time, the printer control section 20 cuts the thermal roll paper at a predetermined position by the printing section 26, and issues a receipt. Further, in the printer control section 20, when the printer BLT communication section 25 receives the display data after the accounting processing from the POS terminal device 3, the printer device communication section 22 transmits the received display data to the customer display 4. Thus, the customer display 4 displays the information such as the total amount of money, the money received, the change, and the like. Note that the total amount of money, the money received, the change, and the like, also correspond to the accounting information.

In the above-described operation of the printer 2, a configuration in which the printing is performed every time the print data is received has been described, but a mode of printing is not limited to this configuration. For example, a configuration may be adopted in which, until receiving print data after accounting processing, the print data is stored in a predetermined buffer, and the print data that has been received so far is printed at once at a timing at which the print data or the cut command after accounting processing has been received. Even in this case, since the customer display 4 displays the product information of the product to be read by the barcode scanner 5, the customer can visually view the product name and the unit price of the product by the customer display 4 with respect to the product to which the barcode is attached and read by the register cashier using the barcode scanner 5.

In the Bluetooth standard, a power saving mode is defined in which, when data communication is not performed, a minimum necessary processing for maintaining synchronization in a piconet is performed, thereby suppressing power consumption. The power saving mode defined in the Bluetooth standard includes a Sniff mode and a Passive mode.

The Sniff mode is a mode in which an active state is set at regular intervals, data is transmitted and received between a slave and a master, and in other periods, an inactive state is set and wireless communication is stopped to suppress power consumption. In the Sniff mode, information is transmitted and received to maintain synchronization within a piconet at this regular interval, and synchronization within a piconet is maintained. In this embodiment, when the operation mode of the printer BLT communication section 25 is in the Sniff mode, the printer BLT communication section 25 transmits a communication request to the POS terminal device 3 at regular intervals. The communication request is a request to transmit data toward the POS terminal device 3. Note that the predetermined interval corresponds to a communication request interval.

Although the Passive mode is a mode in which power consumption is suppressed as in the Sniff mode, unlike the Sniff mode, the Passive mode is a mode in which data transmission and reception between the slave and the master at a regular interval is not performed. In the Passive mode, the wireless communication is stopped for a certain period of time, and after the lapse of a certain period of time, the information is transmitted and received in order to maintain synchronization in the piconet, thus maintaining the synchronization in the piconet. This Passive mode is also called "Hold mode".

Since the synchronization in the piconet is maintained in both the Sniff mode and the Passive mode, even if the operation mode is in the Sniff mode or the Passive mode, it is possible to quickly shift to a normal mode. Note that the normal mode is an operation mode in which wireless communication can be always performed.

The printer BLT communication section 25 according to this embodiment enables to change the type of the power saving mode to be shifted from the normal mode based on the setting value set in the type setting item of the BLT setting file 253*a*. For example, when the setting value indicating the "Sniff mode" is set as the type setting item, the printer BLT communication section 25 shifts the operation mode to the Sniff mode from the normal mode. Similarly, when the setting value indicating the "Passive mode" is set as the type setting item, the printer BLT communication section 25 shifts the operation mode to the Passive mode from the normal mode.

In addition, when the operation mode is in the Sniff mode, the printer BLT communication section 25 of this embodiment performs a communication request to the POS terminal device 3 at a communication request interval based on the setting value set in the request interval setting item of the BLT setting file 253*a*. For example, when a setting value indicating "250 ms (milliseconds)" is set as the request interval setting item, the printer BLT communication section 25 transmits a communication request to the POS terminal device 3 at a communication request interval of "250 ms" in the Sniff mode. Upon receiving a communication request from the printer 2, when there is data to be transmitted to the printer 2, the POS terminal device 3 returns a response to the communication request. Upon receiving the response, the printer BLT communication section 25 shifts the operation mode to the normal mode from the Sniff mode, and performs wireless communication with the POS terminal device 3.

Here, if the communication state between the printer 2 and the POS terminal device 3 is unstable when the operation mode of the printer BLT communication section 25 is in the sniff mode, the following problem occurs.

Figure 2:
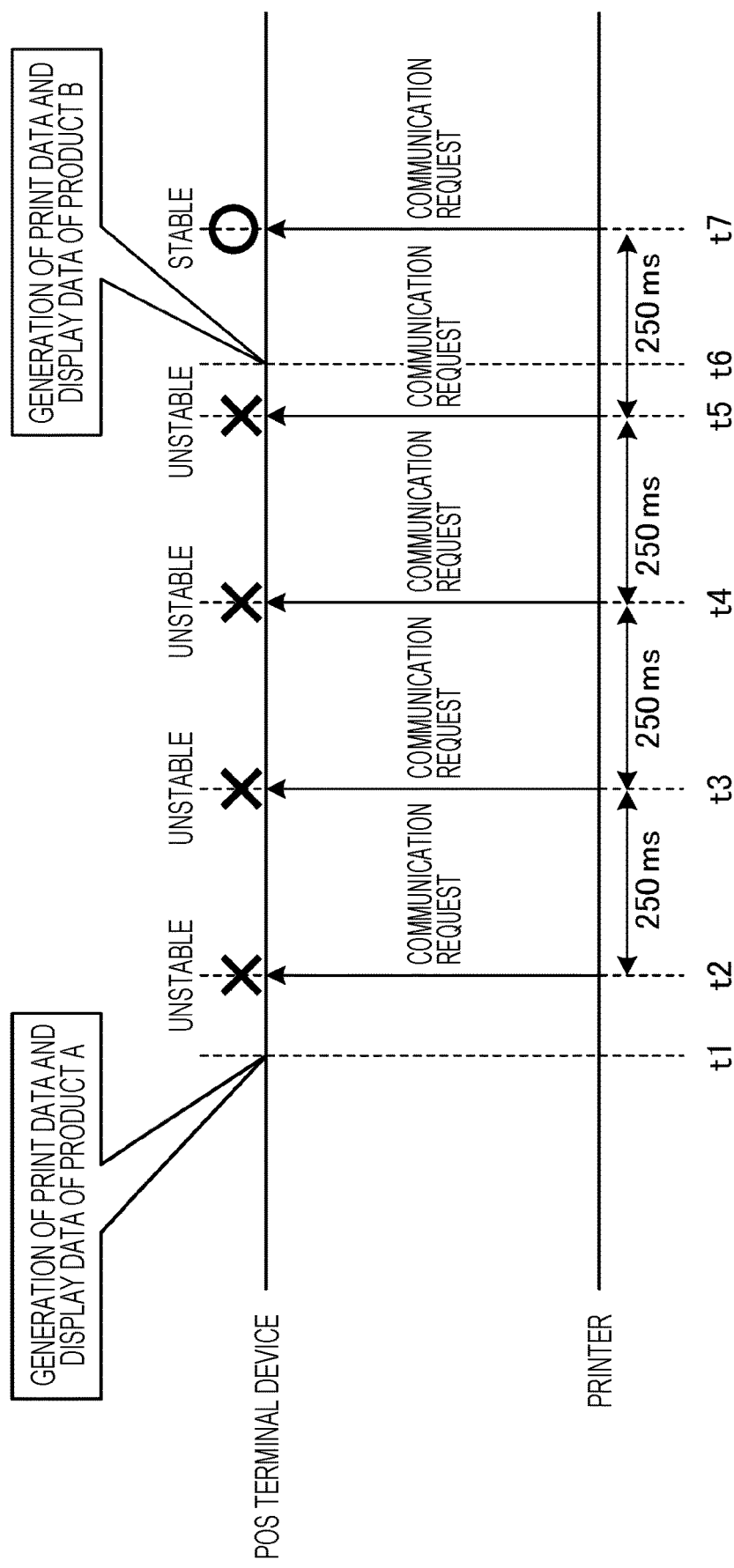
FIG. 2 is a diagram for explaining a problem in the case of a Sniff mode.

FIG. 2 is a diagram for explaining a problem when the operation mode of the printer BLT communication section 25 is in the Sniff mode.

FIG. 2 shows timings of operations of the POS terminal device 3 and the printer 2. In FIG. 2, it is assumed that the operation mode of the printer BLT communication section 25 is in the Sniff mode at the start of the operation. In addition, in the description of FIG. 2, it is assumed that a setting value indicating "250 ms" is set as the request interval setting item of the BLT setting file 253*a*.

At timing t1, it is assumed that a barcode reading by the barcode scanner 5 is performed for the "product A". At timing t1, the POS terminal control section 30 of the POS terminal device 3 generates the print data and the display data for the "product A" on the basis of the product code received from the barcode scanner 5 and the product master 311 stored in the POS terminal storage section 31. Note that, at timing t1, since the operation mode of the printer BLT communication section 25 is in the Sniff mode, the generated print data and the display data are not transmitted from the POS terminal device 3 to the printer 2.

As shown in FIG. 2, at timing t2, it is assumed that a request communication interval (250 ms) has elapsed from the transmission of the previous communication request. Then, the printer control section 20 of the printer 2 transmits a communication request to the POS terminal device 3 by the printer BLT communication section 25. Here, at timing t2, it is assumed that the communication state between the POS terminal device 3 and the printer 2 is unstable due to a given factor. In this case, as shown in FIG. 2, the POS terminal device 3 cannot receive the communication request transmitted from the printer 2 at timing t2. Therefore, the POS terminal device 3 cannot transmit the print data and the display data of the "product A" to the printer 2. In other words, a delay occurs in the transmission of the print data and the display data of the "product A" in the POS terminal device 3. This leads to a delay in the display of the product information of the "product A" in the customer display 4.

It is assumed that the request communication interval has elapsed from timing t2, reaching timing t3. Then, as shown at timing t3 in FIG. 2, the printer control section 20 of the printer 2 transmits a communication request to the POS terminal device 3 by the printer BLT communication section 25. Here, like timing t2, it is assumed that the communication state between the POS terminal device 3 and the printer 2 is unstable at timing t3. In this case, as shown in FIG. 2, the POS terminal device 3 cannot receive the communication request transmitted from the printer 2 at timing t3. Therefore, even at timing t3, the POS terminal device 3 cannot transmit the print data and the display data of the "product A" to the printer 2, and further delay occurs in the transmission of the print data and the display data of the "product A".

Assume that the request communication interval is elapsed from timing t3, reaching timing t4. Then, as shown at timing t4 in FIG. 2, the printer control section 20 of the printer 2 transmits a communication request to the POS terminal device 3 by the printer BLT communication section 25. However, if the communication state between the POS terminal device 3 and the printer 2 is unstable, the POS terminal device 3 cannot receive the communication request transmitted from the printer 2 at timing t4, and cannot transmit the print data and the display data of the "product A" to the printer 2. As a result, a delay in transmission of the print data and the display data of the "product A" occurs in the POS terminal device 3 for a further 250 ms, which is the equivalent of the required communication interval, from timing t3.

Assume that the request communication interval has elapsed from timing t4, reaching timing t5. Then, as shown at timing t5 in FIG. 2, the printer control section 20 of the printer 2 transmits a communication request to the POS terminal device 3 by the printer BLT communication section 25. However, if the communication state between the POS terminal device 3 and the printer 2 is unstable, the POS terminal device 3 cannot receive the communication request transmitted from the printer 2 at timing t5, and cannot transmit the print data and the display data of the "product A" to the printer 2. As a result, a delay occurs in the POS terminal device 3 in the transmission of the print data and the display data of the "product A" for a further "250 ms", which is the equivalent of the required communication interval, from timing t4.

It is assumed that, after timing t5, a period is elapsed to reach timing t6, and the barcode scanner 5 reads barcode data of a "product B". Then, at timing t6, the POS terminal control section 30 of the POS terminal device 3 generates the print data and the display data for the "product B" on the basis of the product code received from the barcode scanner 5 and the product master 311 stored in the POS terminal storage section 31. Note that, at timing t6, since the operation mode of the printer BLT communication section 25 is in the Sniff mode, the generated print data and the display data are not transmitted from the POS terminal device 3 to the printer 2.

Assume that a request communication interval has elapsed from timing t5 reaching timing t7. Then, as shown at timing t7 in FIG. 2, the printer control section 20 of the printer 2 transmits a communication request to the POS terminal device 3 by the printer BLT communication section 25. At timing t7, it is assumed that the communication state between the POS terminal device 3 and the printer 2 is stable. Then, the POS terminal device 3 receives the communication request transmitted from the printer 2 at timing t7. Thus, the POS terminal device 3 and the printer 2 can communicate wirelessly. However, after timing t7, the print data and the display data transmitted from the POS terminal device 3 to the printer 2 are the print data and the display data of the "product A". This is because the print data and the display data of the "product A" are generated before the print data and the display data of the "product B". Therefore, although the product at an instant at which the barcode is read by the barcode scanner 5 is for the "product B", the product information for the product A which was read by the barcode scanner 5 before reading the barcode of the "product B" is displayed on the customer display 4. As such, there is a possibility that a difference occurs between the product read by the barcode scanner 5 and the product indicated by the product information displayed by the customer display 4, and there is a possibility of misunderstanding to arise for the customer who views the display and the register cashier. Note that some types of barcode scanner 5 may make a sound of a buzzer when a barcode is read. When the customer and the register cashier watch the customer display 4 at the timing when the buzzer makes a sound, the customer and the register cashier may recognize that the product read by the barcode scanner 5 and the product displayed by the customer display 4 are different from each other. On the other hand, even if the transmission of the print data is delayed, since the customer and the register cashier view the receipt printed by the printer 2 after the series of accounting processing end, there is no such problem.

In this way, when the operation mode of the printer BLT communication section 25 is in the Sniff mode, if the communication state between the POS terminal device 3 and the printer 2 is unstable, a delay may occur in the transmission of the print data and the display data of the product read by the barcode scanner 5. In the case of FIG. 2, a delay occurs in the transmission of the print data and the display data of the "product A", at least from timing t2 to timing t7 (about 1 second). Further, when a barcode of another product is read by the barcode scanner 5 during this delay, when the communication state between the POS terminal device 3 and the printer 2 becomes stable, a difference occurs between the product read by the barcode scanner 5 and the product indicated by the product information displayed by the customer display 4.

Here, it is conceivable to reduce the delay of transmission of the print data and the display data generated by the POS terminal device 3 by shortening the request communication interval for transmitting the communication request and increasing the probability that the POS terminal device 3 receives the communication request. However, when it is configured such that the customer display 4 is not connected to the printer 2, if the request communication interval is shortened, electric power is unnecessarily consumed, and thus, the effect of power saving which is the main point of the Sniff mode is reduced. The reason why the shortening of the request communication interval results in more consumption of the electric power is because the interval at which the printer BLT communication section 25 becomes active in the Sniff mode is shortened.

As described above, when the operation mode of the printer BLT communication section 25 is in the Sniff mode, there is a case where the power saving control and the control of the customer display 4 cannot be appropriately performed.

Therefore, the printer 2 of this embodiment performs the following operations.

Figure 3:
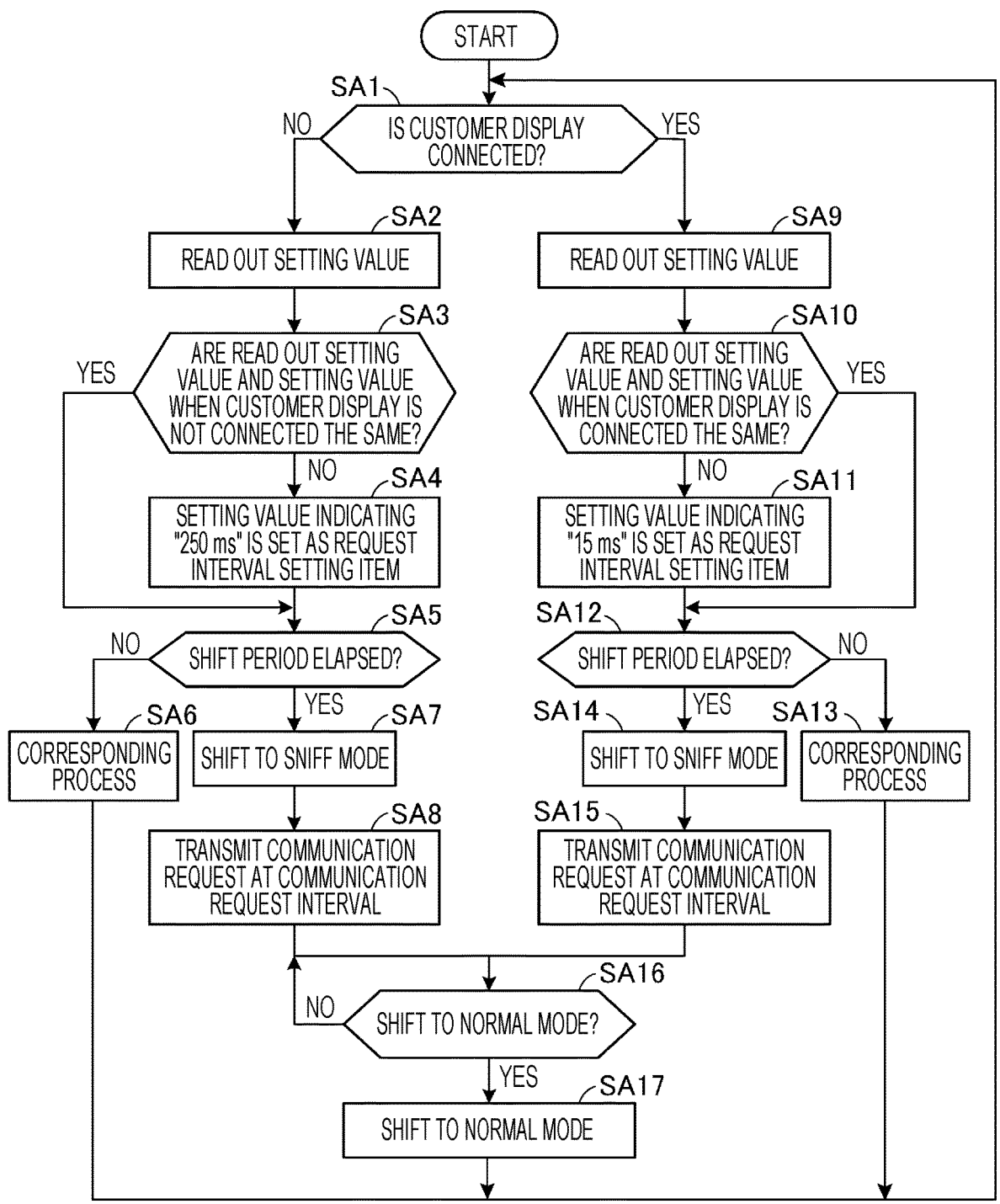
FIG. 3 is a flowchart showing an operation of a printer.

FIG. 3 is a flowchart showing an operation of the printer 2.

In the description of the flowchart shown in FIG. 3, it is assumed that the setting value set as the type setting item of the BLT setting file 253a is a setting value indicating the "Sniff mode", and the setting value set as the shift period setting item is a setting value indicating "255 s (seconds)". In the description of the flowchart shown in FIG. 3, it is assumed that these set values are not changed.

The printer control section 20 determines whether or not the customer display 4 is connected to the printer device communication section 22 (Step SA1). For example, when a signal indicating that a control line of the customer display 4 is being connected is input by the printer device communication section 22, the printer control section 20 determines that the printer device communication section 22 is connected with the customer display 4 (Step SA1: YES).

When the printer control section 20 determines that the customer display 4 is not connected to the printer device communication section 22 (Step SA1: NO), the printer control section 20 reads out the setting value corresponding to the request interval setting item of the BLT setting file 253a (Step SA2). Next, based on the setting value read out in Step SA2 and the setting value table 211 stored in the printer storage section 21, the printer control section 20 determines whether or not the setting value read out in Step SA2 and the setting value set as the request interval setting item when the customer display 4 is not connected are the same (Step SA3).

FIG. 4 is a diagram showing an example of the setting value table 211.

As shown in FIG. 4, a connection field F1 and an unconnected field F2 are associated with one record of the setting value table 211.

The connection field F1 stores a setting value to be set as the BLT setting file 253a when the customer display 4 is connected to the printer device communication section 22. The unconnected field F2 stores a setting value to be set as the BLT setting file 253a when the customer display 4 is not connected to the printer device communication section 22.

As shown in FIG. 4, the setting value table 211 stores a plurality of records. A record R1 is a record for storing a setting value to be set as the request interval setting item for an interval at which the printer 2 transmits a communication request in the BLT setting file 253a, and stores a setting value indicating "15 ms" in the connection field F1 and a setting value indicating "250 ms" in the unconnected field F2.

A record R2 is a record for storing a setting value to be set as a shift period setting item for a period in which the printer 2 shifts to the power saving mode in the BLT setting file 253a, and stores a setting value indicating "255 s" in the connection field F1 and also stores a setting value indicating "1 s" in the unconnected field F2.

A record R3 is a record for storing a setting value to be set as a type period setting item for the type of the power saving mode in the Bluetooth standard of the printer 2 in the BLT setting file 253a, and stores a setting value indicating a "Sniff mode" and a setting value indicating a "Passive mode" in the connection field F1 and the unconnected field F2, respectively. Note that, regardless of whether or not the customer display 4 is connected, the printer BLT communication section 25 can shift to either the Sniff mode or the Passive mode, so that the record R3 stores the setting value of either mode in both the connection field F1 and the unconnected field F2.

Note that the setting value of the communication request interval stored in the setting value table 211 is obtained by a test in advance, a simulation, or the like. In particular, the setting value of the communication request interval stored in the setting value table 211, which is shorter in the communication request interval, is set as a setting value which can suppress the occurrence of a difference between the product read by the barcode scanner 5 and the product indicated by the product information displayed by the customer display 4 even when a plurality of products are sequentially read by the barcode scanner 5 by a test in advance, a simulation, or the like. Also, a setting value of a shift period stored in the setting value table 211 is obtained by a test in advance, a simulation, or the like.

For example, assume that a setting value indicating "15 ms" is set as the request interval setting item of the BLT setting file 253a. In this case, in Step SA2, the printer control section 20 reads out the setting value indicating "15 ms". Then, the printer control section 20 identifies the record R1 for storing the setting value to be set as the request interval setting item from the setting value table 211. Then, in Step SA3, the printer control section 20 compares the setting value indicating the read out "15 ms" with the setting value stored in the unconnected field F2 of the specified record R1, and determines whether or not the setting values are the same. In this case, as shown in FIG. 4, since the setting value indicating "250 ms" is stored in the unconnected field F2 of the record R1, the printer control section 20 determines that the setting value read out in Step SA2 and the setting value set as the request interval setting item when the customer display 4 is not connected are not the same (Step SA3: NO).

Further, assume that a setting value indicating "250 ms" is set as the request interval setting item of the BLT setting file 253a, for example. When it is determined that the customer display 4 is not connected (Step SA1: NO), in Step SA2, the printer control section 20 reads out a setting value indicating "250 ms". Then, the printer control section 20 specifies the record R1 for storing the setting value to be set as the request interval setting item from the setting value table 211. As shown in FIG. 4, since the setting value indicating "250 ms" is stored in the unconnected field F2 of the record R1, the printer control section 20 determines that the setting value read out in Step SA2 and the setting value set as the request interval setting item when the customer display 4 is not connected are the same (Step SA3: YES).

When the printer control section 20 determines that the setting value read out in Step SA2 is equal to the setting value set as the request interval setting item when the customer display 4 is not connected (Step SA3: YES), the printer control section 20 shifts the processing to Step SA5. On the other hand, when the printer control section 20 determines that the setting value read out in Step SA2 and the setting value set as the request interval setting item in the case where the customer display 4 is not connected are not the same (Step SA3: NO), the BLT control section 252 is controlled to set the setting value stored in the setting value table 211 as the request interval setting item of the BLT setting file 253a (Step SA4). In other words, when the setting value table 211 is the setting value table 211 shown in FIG. 4, the printer control section 20 sets a setting value indicating "250 ms" as the request setting item of the BLT setting file 253*a*.

Next, the printer control section 20 determines whether or not a period during which the print data is not received from the POS terminal device 3 (i.e., a period during which a continuous state of no communication with the POS terminal device 3 exists) has exceeded a shift period indicated by a setting value set as the shift period setting item of the BLT setting file 253*a* (Step SA5). In the description of FIG. 3, the setting value set as the shift period setting item is set as "255 s". Accordingly, the printer control section 20 determines whether or not the period during which the print data is not received from the POS terminal device 3 exceeds "255 s".

When the printer control section 20 determines that the period during which the print data is not received from the POS terminal device 3 does not exceed the shift period (255 s in this case) indicated by the setting value set as the shift period setting item (Step SA5: NO), corresponding processing is performed by the printer control section 20 (Step SA6). Here, the corresponding processing means printing based on the received print data.

On the other hand, when the printer control section 20 determines that the shift period during which the print data is not received from the POS terminal device 3 exceeds the shift period (255 s in this case) indicated by the setting value set as the shift period setting item (Step SA5: YES), the operation mode of the printer BLT communication section 25 is shifted to the power saving mode indicated by the setting value set as the type setting item of the BLT setting file 253*a* by the printer control section 20. In the description of FIG. 3, the setting value set as the type setting item is set as a setting value indicating the "Sniff mode". For this reason, when the printer control section 20 determines that a period during which no print data is received from the POS terminal device 3 exceeds the shift period (255 s in this case) indicated by the setting value set as the shift period setting item (Step SA5: YES), the operation mode of the printer BLT communication section 25 is shifted to the Sniff mode (Step SA7) by the printer control section 20.

When the printer control section 20 shifts the operation mode of the printer BLT communication section 25 to the Sniff mode, the printer control section 20 controls the BLT control section 252, temporarily stops the wireless communication with the POS terminal device 3, and transmits a communication request to the POS terminal device 3 at a communication request interval indicated by a setting value set as the request interval setting item of the BLT setting file 253*a* (Step SA8). The printer control section 20 determines whether or not the operation mode of the printer BLT communication section 25 is to be shifted to the normal mode (Step SA16), and this operation is repeated. In Step SA8, the customer display 4 is not connected to the printer 2. Therefore, as will become apparent later, the printer control section 20 transmits a communication request to the POS terminal device 3 at a communication request interval longer than the communication request interval of the time when the customer display 4 is connected.

Returning to the explanation of Step SA1 of the flowchart shown in FIG. 3, when the printer control section 20 determines that the customer display 4 is connected to the printer device communication section 22 (Step SA1: YES), the printer control section 20 reads out the setting value corresponding to the request interval setting item of the BLT setting file 253*a* (Step SA9). Next, the printer control section 20 determines whether or not the setting value read out in Step SA9 and the setting value to be set as the request interval setting item when the customer display 4 is connected are the same based on the setting value read out in Step SA9 and the setting value table 211 stored in the printer storage section 21 (Step SA10). As described in Step SA2 to Step SA3, the printer control section 20 performs processing in Step SA10.

When the printer control section 20 determines that the setting value read out in Step SA9 and the setting value to be set as the request interval setting item when the customer display 4 is connected are the same (Step SA10: YES), the printer control section 20 shifts the processing to Step SA12. On the other hand, when the printer control section 20 determines that the setting value read out in Step SA9 and the setting value to be set as the request interval setting item when the customer display 4 is connected are not the same (Step SA10: NO), the printer control section 20 controls the BLT control section 252 to set the setting value stored in the setting value table 211 as the request interval setting item of the BLT setting file 253*a* (Step SA11). In other words, when the setting value table 211 is the setting value table 211 shown in FIG. 4, the printer control section 20 sets a setting value indicating "15 ms" as the request setting item of the BLT setting file 253*a*.

Next, the printer control section 20 determines whether or not a period during which the print data or the display data is not received from the POS terminal device 3 (i.e., a time during which a state where no communication with the POS terminal device 3 is continued) exceeds a shift period indicated by a setting value set as the shift period setting item of the BLT setting file 253*a* (Step SA12). In the description of FIG. 3, the setting value set as the shift period setting item is set as "255 s". Accordingly, the printer control section 20 determines whether or not the period during which the print data is not received from the POS terminal device 3 exceeds "255 s".

When the printer control section 20 determines that the period during which the print data or the display data is not received from the POS terminal device 3 does not exceed the shift period (255 s in this case) indicated by the setting value set in the shift value setting item (Step SA12: NO), the printer control section 20 performs the corresponding processing (Step SA13). The corresponding processing here is a printing based on the received print data or a display based on the display data received by the customer display 4.

On the other hand, when the printer control section 20 determines that the period during which the print data or the display data is not received from the POS terminal device exceeds the shift period (255 s in this case) indicated by the setting value set in the shift period setting item (Step SA12: YES), the printer control section 20 shifts the operation mode of the printer BLT communication section 25 to the Sniff mode (Step SA14).

When the printer control section 20 shifts the operation mode of the printer BLT communication section 25 to the Sniff mode, the printer control section 20 controls the BLT control section 252, temporarily stops wireless communication with the POS terminal device 3, and transmits a communication request to the POS terminal device 3 at a communication request interval indicated by a setting value to be set as the request interval setting item of the BLT setting file 253*a* (Step SA15). The printer control section 20 determines whether or not the operation mode of the printer BLT communication section 25 is to be shifted to the normal mode (Step SA16), and this operation is repeated. In Step SA15, the customer display 4 is connected to the printer 2. Therefore, the printer control section 20 transmits a communication request to the POS terminal device 3 at a communication request interval (15 ms in this case) shorter than a communication request interval (250 ms in this case) when the customer display 4 is not connected.

Next, the printer control section 20 determines whether or not to shift the operation mode of the printer BLT communication section 25 to the normal mode (Step SA16). For example, when the printer control section 20 receives a response with respect to the communication request from the POS terminal device 3 by the printer BLT communication section 25, the printer control section 20 determines that the operation mode of the printer BLT communication section 25 is shifted to the normal mode (Step SA16: YES).

When the printer control section 20 determines that the operation mode of the printer BLT communication section 25 is not shifted to the normal mode (Step SA16: NO), the printer control section 20 returns processing to Step SA16, and determines again whether or not to shift the operation mode of the printer BLT communication section 25 to the normal mode.

On the other hand, when the printer control section 20 determines that the operation mode of the printer BLT communication section 25 is shifted to the normal mode (Step SA16: YES), the printer control section 20 shifts the operation mode of the printer BLT communication section 25 to the normal mode (Step SA17). Then, the printer control section 20 returns processing to Step SA1.

In this way, the printer control section 20 changes the communication request interval depending on whether or not the customer display 4 is connected to the printer device communication section 22. More specifically, the printer control section 20 sets the communication request interval when the customer display 4 is connected to the printer device communication section 22 shorter than the communication request interval when the customer display 4 is not connected. Thus, the printer control section 20 has the following effects.

Figure 5:
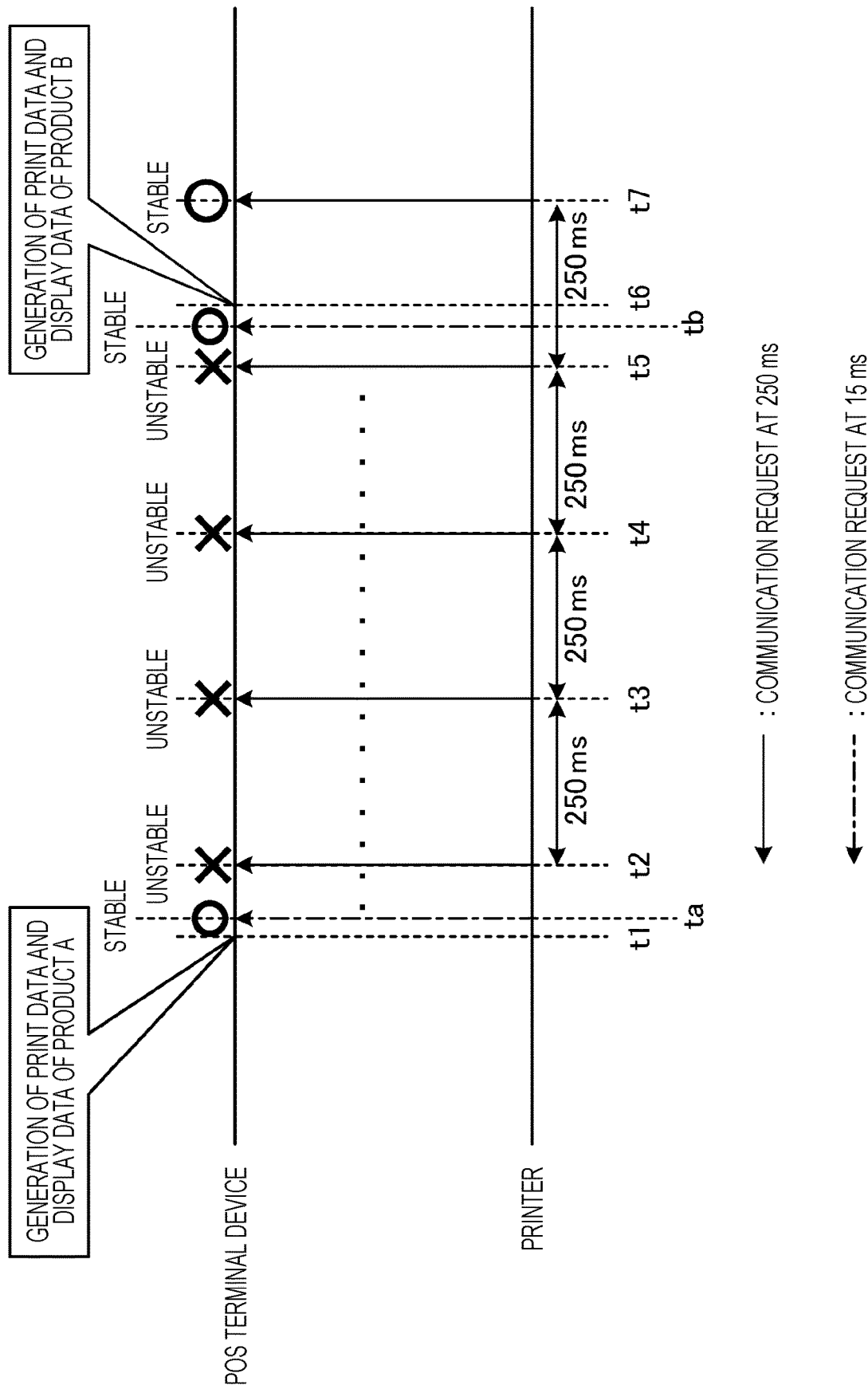
FIG. 5 is a diagram for explaining an effect of changing a communication request interval.

FIG. 5 is a diagram for explaining an effect of changing the communication request interval according to whether or not the customer display 4 is connected to the printer device communication section 22.

FIG. 5 shows timing of operations of the POS terminal device 3 and the printer 2. Similarly to FIG. 2, at the start of the operation in FIG. 5, it is assumed that the operation mode of the printer BLT communication section 25 is in the Sniff mode.

In FIG. 5, a solid-line arrow indicates transmission of a communication request at a communication request interval (250 ms) when the customer display 4 is not connected to the printer device communication section 22. In addition, transmission indicated by the solid-line arrows in FIG. 5 is performed at the same timing as the transmission indicated by solid-line arrows shown in FIG. 2. In addition, a dashed-dotted line arrow indicates transmission of a communication request at a communication request interval (15 ms) when the customer display 4 is connected to the printer device communication section 22.

As shown in FIG. 5, when the communication request interval in the case where the customer display 4 is connected to the printer device communication section 22 is made shorter than the communication request interval in the case where the customer display 4 is not connected, the printer control section 20 is highly likely to transmit the communication request by the printer BLT communication section 25 at a timing ta earlier than the timing t2. For this reason, even when the communication state between the POS terminal device 3 and the printer 2 is unstable from the timing t2 to a timing t5, the printer control section 20 can transmit a communication request at the timing ta earlier than the timing t2, and therefore, before reading with respect to the "product B" is performed by the barcode scanner 5, the print data and the display data of the "product A" can be received from the POS terminal device 3. Therefore, when the customer display 4 is connected, the printer control section 20 can quickly display the product information on the customer display 4 and appropriately control the customer display 4.

Further, as shown in FIG. 5, if the communication request interval when the customer display 4 is connected to the printer device communication section 22 is shorter than the communication request interval when the customer display 4 is not connected, even if the communication request cannot be transmitted at a timing earlier than the timing t2, the printer control section 20 is highly likely to transmit a communication request at a timing tb earlier than the timing t6 by the printer BLT communication section 25. Therefore, since the printer control section 20 can transmit a communication request at the timing tb earlier than the timing t6, it is possible to receive the print data and the display data of the "Product A" from the POS terminal device 3 before reading with respect to the "Product B" by the barcode scanner 5 is performed. Thus, when the customer display 4 is connected, the printer control section 20 can promptly display the product information on the customer display 4 and appropriately control the customer display 4.

As shown in FIG. 5, the printer control section 20 enables the customer display 4 to quickly display the product information by setting the communication request interval when the customer display 4 is connected to the printer device communication section 22 shorter than the communication request interval when the customer display 4 is not connected. Thus, the printer control section 20 can suppress the occurrence of a difference between the product to be read by the barcode scanner 5 and the product indicated by the product information displayed by the customer display 4, and can prevent the customer or the person in charge of the registration from misunderstanding.

Further, in a case where the printer 2 is configured to perform printing every time the printer 2 receives print data, i.e., in a case where the printer control section 20 alternately performs printing based on the print data and transmission of the display data to the customer display 4, the following effects can be obtained. In other words, since the printer control section 20 can receive the print data and the display data from the POS terminal device 3 at a fast timing, it is possible to suppress the occurrence of a delay in the printing based on the print data and the display of the product information on the customer display 4. Accordingly, the printer control section 20 can suppress the occurrence of a difference between the product to be read by the barcode scanner 5 and the product indicated by the printed product information. Thus, the printer control section 20 can prevent a person who issues a receipt such as a register person from misunderstanding.

Further, as shown in FIG. 5, the printer control section 20 sets the communication request interval when the customer display 4 is not connected to the printer device communication section 22 longer than the communication request interval when the customer display 4 is connected. Here, it is assumed to be a configuration in which the printer 2 performs printing based on print data collectively received at a predetermined timing, rather than a configuration in which printing is performed every time the printer 2 receives print data. In this case, if the customer display 4 is not connected and the customer is not provided with the product information, the printer control section 20 has less need to shorten the communication request interval. This is because the product information on the product to be read by the barcode scanner 5 is not output by means of printing, displaying, or the like in accordance with the timing at which the barcode scanner 5 performs reading. Here, as described above, when the communication request interval is shortened, the printer control section 20 unnecessarily transmits a communication request by the printer BLT communication section 25, whereby this unnecessarily consumes power. Therefore, by setting the communication request interval in the case where the customer display 4 is not connected to the printer device communication section 22 longer than the communication request interval in the case where the customer display 4 is connected, the printer control section 20 can prevent unnecessary power consumption and appropriately control power saving.

In the above operation, there has been described the configuration in which the communication request interval is made different between the case where the customer display 4 is connected and the case where the customer display is not connected. However, in accordance with the communication request interval, the shift period may also be made different. The operation of this configuration will be described below.

Figure 6:
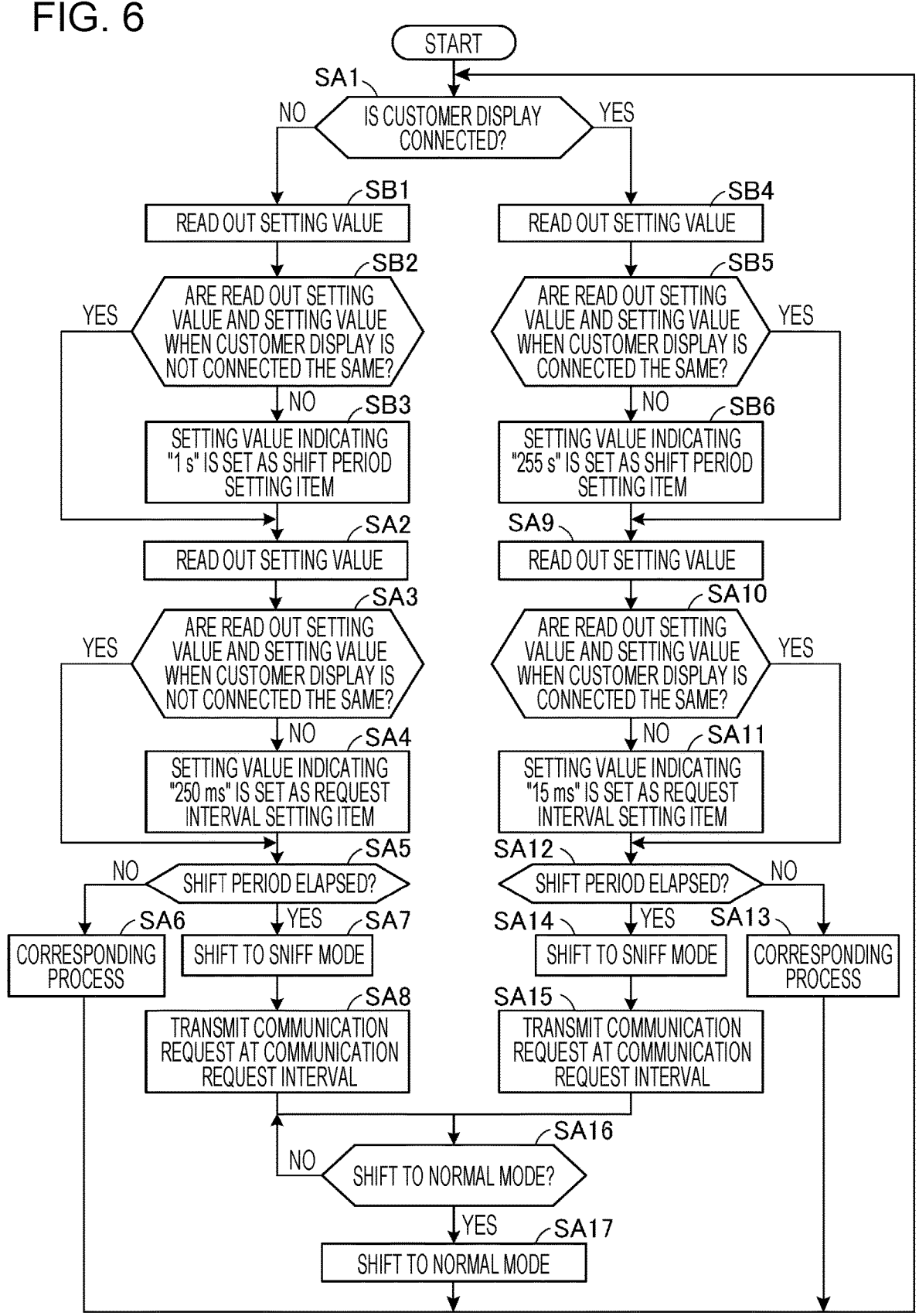
FIG. 6 is a flowchart showing an operation of a printer.

FIG. 6 is a flowchart showing an operation of the printer 2 in a case where the shift period is made different depending on whether or not the customer display 4 is connected to the printer device communication section 22.

In the flowchart of FIG. 6, the same steps as those of the flowchart of FIG. 3 are given the same step numbers, and detailed description thereof will be omitted.

In the description of the flowchart shown in FIG. 6, it is assumed that the setting value set in the type setting item of the BLT setting file 253*a* is a setting value indicating the "Sniff mode". In the description of the flowchart shown in FIG. 6, it is assumed that the setting value is not changed.

When the printer control section 20 determines that the customer display 4 is not connected to the printer device communication section 22 (Step SA1: NO), the printer control section 20 reads out the setting value corresponding to the shift period setting item of the BLT setting file 253*a* (Step SB1). Next, the printer control section 20 determines whether or not the setting value read out in Step SB1 and the setting value to be set as the shift period setting item when the customer display 4 is not connected are the same based on the setting value read out in Step SB1 and the setting value table 211 stored in the printer storage section 21 (Step SB2).

For example, assume that a setting value indicating "255 s" is set as the shift period setting item of the BLT setting file 253*a*. In this case, in Step SB1, the printer control section 20 reads out the setting value indicating "255 s". Then, the printer control section 20 specifies the record R2 for storing a setting value to be set as the shift period setting item from the setting value table 211. Then, in Step SB2, the printer control section 20 compares the read setting value indicating the "255 s" with the setting value to be stored as the unconnected field F2 of the specified record R2, and determines whether or not the setting values are the same. In this case, as shown in FIG. 4, since the setting value indicating "1 s" is stored in the unconnected field F2 of the record R2, the printer control section 20 determines that the setting value read out in Step SB1 and the setting value to be set as the shift period setting item when the customer display 4 is not connected are not the same (Step SB2: NO).

Further, for example, assume that a setting value indicating "1 s" is set as the shift period setting item of the BLT setting file 253*a*. In this case, in Step SB1, the printer control section 20 reads out the setting value indicating "1 s". Then, the printer control section 20 specifies the record R2 for storing a setting value to be set as the shift period setting item from the setting value table 211. As shown in FIG. 4, since the setting value indicating "1 s" is stored in the unconnected field F2 of the record R2, the printer control section 20 determines that the setting value read out in Step SB1 and the setting value to be set as the shift period setting item when the customer display 4 is not connected are the same (Step SB2: YES).

When the printer control section 20 determines that the setting value read out in Step SB1 and the setting value to be set as the shift period setting item when the customer display 4 is not connected are the same (Step SB2: YES), the processing is shifted to Step SA2. On the other hand, when the printer control section 20 determines that the setting value read out in Step SB1 and the setting value to be set as the shift period setting item when the customer display 4 is not connected are not the same (Step SB2: NO), the printer control section 20 controls the BLT control section 252 to set the setting value stored in the setting value table 211 as the shift period setting item of the BLT setting file 253*a* (Step SB3). In other words, when the setting value table 211 is the setting value table 211 shown in FIG. 4, the printer control section 20 sets a setting value indicating "1 s" as the shift period setting item of the BLT setting file 253*a*.

Next, the printer control section 20 performs processing in Step SA2 to Step SA4, and then performs processing in Step SA5. In other words, the printer control section 20 determines whether or not a period during which the print data is not received from the POS terminal device 3 exceeds a shift period indicated by the setting value set in the shift period setting item of the BLT setting file 253*a* (Step SA5). In the description of Step SA5 of FIG. 6, the setting value set as the shift period setting item is set to "1 s". Accordingly, the printer control section 20 determines whether or not the period during which the print data is not received from the POS terminal device 3 exceeds "1 s".

Returning to the explanation of Step SA1 of the flowchart shown in FIG. 6, when the printer control section 20 determines that the customer display 4 is connected to the printer device communication section 22 (Step SA1: NO), the printer control section 20 reads out the setting value corresponding to the shift period setting item of the BLT setting file 253*a* (Step SB4). Next, based on the setting value read out in Step SB4 and the setting value table 211 stored in the printer storage section 21, the printer control section 20 determines whether or not the setting value read out in Step SB4 and the setting value to be set as the shift period setting item when the customer display 4 is connected are the same (Step SB5).

For example, assume that a setting value indicating "1 s" is set in the shift period setting item of the BLT setting file 253*a*. In this case, in Step SB4, the printer control section 20 reads out the setting value indicating "1 s". Then, the printer control section 20 specifies the record R2 for storing a setting value to be set as the shift period setting item from the setting value table 211. Then, the printer control section 20 compares the setting value indicating "1 s" read out in Step SB4 with the setting value stored in the connection field F1 of the specified record R2, and determines whether or not the setting values are the same. In this case, as shown in FIG. 4, since the setting value indicating "255 s" is stored in the connection field F1 of the record R2, the printer control section 20 determines that the setting value read out in Step SB4 and the setting value to be set as the shift period setting item when the customer display 4 is connected are not the same (Step SB5: NO).

Further, for example, assume that a setting value indicating "255 s" is set in the shift period setting item of the BLT setting file 253a. In this case, in Step SB4, the printer control section 20 reads out the setting value indicating "255 s". Then, the printer control section 20 specifies the record R2 for storing a setting value to be set as the shift period setting item from the setting value table 211. As shown in FIG. 4, since the setting value indicating "255 s" is stored in the connection field F1 of the record R2, the printer control section 20 determines that the setting value read out in Step SB4 and the setting value to be set as the shift period setting item when the customer display 4 is connected are the same (Step SB5: YES).

When the printer control section 20 determines that the setting value read out in Step SB4 and the setting value to be set as the shift period setting item when the customer display 4 is connected are the same (Step SB5: YES), the processing is shifted to Step SA9. On the other hand, when the printer control section 20 determines that the setting value read out in Step SB4 and the setting value to be set as the shift period setting item when the customer display 4 is connected are not the same (Step SB5: NO), the printer control section controls the BLT control section 252 and sets the setting value stored in the setting value table 211 as the shift period setting item of the BLT setting file 253a (Step SB6). In other words, when the setting value table 211 is the setting value table 211 shown in FIG. 4, the printer control section 20 sets a setting value indicating "1 s" as the shift period setting item of the BLT setting file 253a.

Next, the printer control section 20 performs processing in Step SA9 to Step SA11, and performs processing in Step SA12. In other words, the printer control section 20 determines whether or not a period during which the print data or the display data is not received from the POS terminal device 3 exceeds the shift period indicated by the setting value set in the shift period setting item of the BLT setting file 253a (Step SA12). In the description of Step SA12 of FIG. 6, the setting value set in the shift period setting item is set as "255 s". Accordingly, the printer control section 20 determines whether or not the period during which the print data or the display data is not received from the POS terminal device 3 exceeds "255 s".

As described above, the printer control section 20 changes the shift periods depending on whether or not the customer display 4 is connected to the printer device communication section 22. More specifically, the printer control section 20 sets the shift period when the customer display 4 is connected to the printer device communication section 22 longer than the shift period when the customer display 4 is not connected.

When the customer display 4 is not connected and the customer is not provided with the product information, the printer control section 20 does not display the product information in accordance with the timing of reading by the barcode scanner 5, and therefore, has less need to quickly transmit the communication request to the POS terminal device 3. Therefore, when the customer display 4 is not connected, the printer control section 20 sets a shift period shorter than a shift period when the customer display 4 is connected, so that the operation mode of the printer BLT communication section 25 can be quickly shifted to the power saving mode. Thus, the printer control section 20 can perform power saving control that emphasizes suppression of power consumption. On the other hand, when the customer display 4 is connected, it is highly necessary for the printer control section 20 to quickly transmit the communication request to the POS terminal device 3 because the customer display 4 is required to display the product information in accordance with the timing of reading by the barcode scanner 5. Therefore, in the case where the customer display 4 is connected, the printer control section 20 sets a shift period longer than a shift period when the customer display 4 is not connected, and thereby shifting the operation mode to the power saving mode with a long period of time, and therefore, even when the display data is received during the shift period, the display data can be quickly transmitted to the customer display 4.

As described above, in the operation shown in FIG. 3, it has been described that the communication request interval is changed depending on whether or not the customer display 4 is connected, and in the operation shown in FIG. 6, it has been described that the shift period is changed in addition to changing of the communication request interval. The operation shown in FIG. 3 and the operation shown in FIG. 6 can be switched by a user operation or the like. This allows the user to perform the desired operation depending on the various aspects in which the POS system 1 is utilized.

Figure 7:
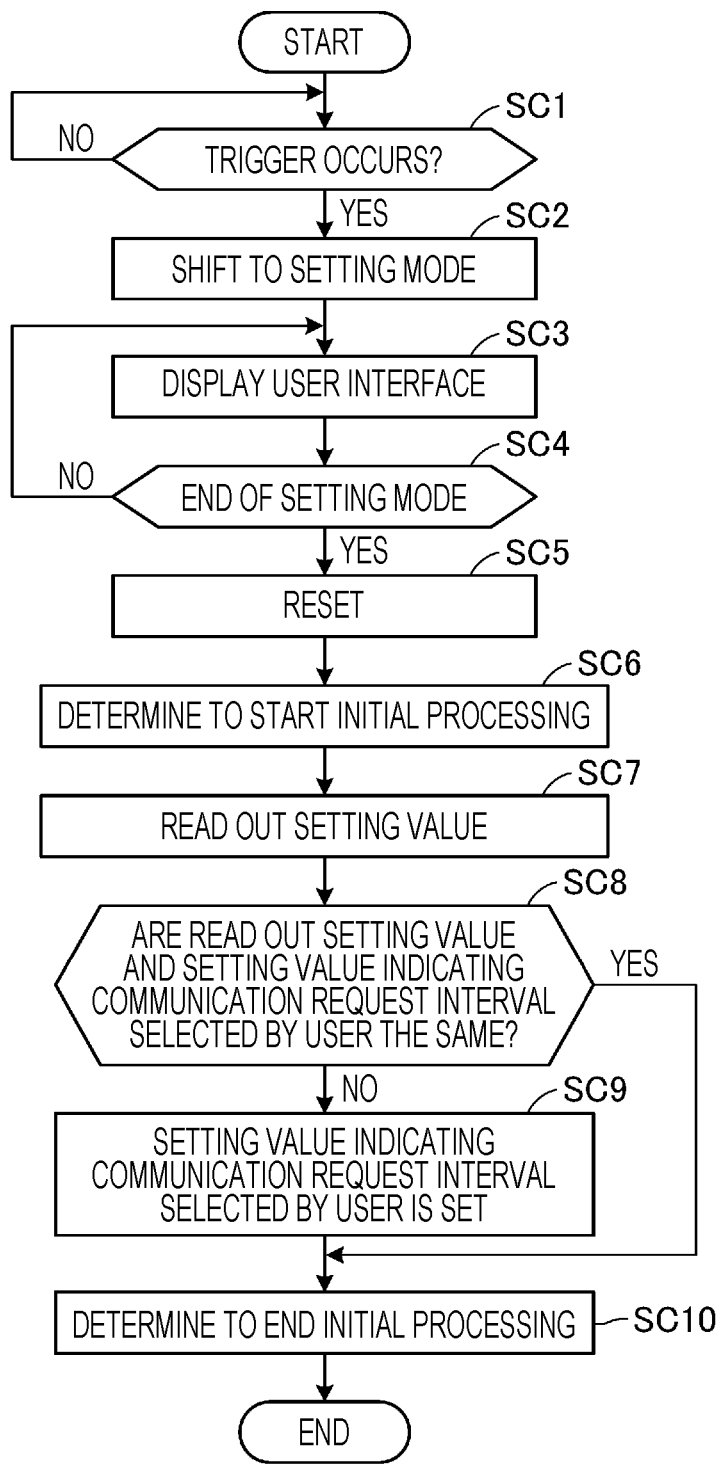
FIG. 7 is a flowchart showing an operation of a printer.

Note that, in FIG. 3 and FIG. 6, as shown in the operation of FIG. 7, setting of a setting value may be performed accompanied by a reset of the printer 2 or may be included in initial processing (described later).

In the above-described operation, there has been described the configuration in which the printer 2 determines whether or not the customer display 4 is connected, and changes the communication request interval, or the communication request interval and the shift period. However, a configuration in which a user changes the communication request interval or the communication request interval and the shift period may be adopted. Hereinafter, an operation in the case where the user changes the communication request interval will be exemplified, and an operation of this configuration will be described.

FIG. 7 is a flowchart illustrating an operation of the printer 2 in the case where the user changes a communication request interval.

In the description of FIG. 7, it is assumed that the customer display 4 is connected to the printer device communication section 22.

The printer control section 20 of the printer 2 determines whether or not a trigger for setting a communication request interval has occurred (Step SC1). For example, when the printer input section 23 detects an instruction to set a communication request interval by a user, the printer control section 20 determines that a trigger for setting a communication request interval has occurred using detection of the printer input section 23 as a trigger (Step SC1: YES).

If the printer control section 20 determines that a trigger for setting the communication request interval has occurred (Step SC1: YES), the printer control section 20 shifts the operation mode to the setting mode (Step SC2). When the printer control section 20 shifts the operation mode to the setting mode, the printer display section 24 displays a predetermined user interface for setting the communication request interval (Step SC2). This user interface is, for example, a screen in which a plurality of communication request intervals are displayed, and one communication request interval can be selected from the plurality of communication request intervals. Also, the user interface displays the communication request interval in a manner such that the communication request interval can be selected, for example, by the number of the setting values stored in the setting value table 211. In other words, when the setting value table 211 is the setting value table 211 shown in FIG. 4, the user interface selectively displays two communication request intervals of "15 ms" and "250 ms".

Next, the printer control section 20 determines whether or not the setting mode is ended (Step SC4). For example, when the user interface displayed in Step SC3 includes a button for fixing the selected communication request interval and the user operates the button, the printer control section 20 determines that the setting mode is ended (Step SC4: YES).

When the printer control section 20 determines that the setting mode is ended (Step SC4: YES), the printer control section 20 ends the setting mode and executes a software reset of the printer 2 (Step SC5). The software reset of the printer 2 is, for example, a restart of the printer 2.

When the printer control section 20 executes the software reset of the printer 2, the printer control section 20 determines that the initial processing is started (Step SC6). The initial processing in this embodiment includes processing for setting a setting value indicating a communication request interval selected by a user as the request interval setting item of the BLT setting file 253a. In addition to the processing for setting the setting value, the initial processing may include other processing.

When the printer control section 20 determines that the initial processing is started, the printer control section 20 reads out the setting value set as the request interval setting item of the BLT setting file 253a (Step SC7). Next, the printer control section 20 determines whether or not the setting value read out in Step SC7 and the setting value indicating the communication request interval selected by the user are the same based on the setting value read out in Step SC7 and the setting value table 211 stored in the printer storage section 21 (Step SC8).

When the printer control section 20 determines that the setting value read out in Step SC7 and the setting value indicating the communication request interval selected by the user are the same (Step SC8: YES), the printer control section 20 shifts the processing to Step SC9 and determines that the initial processing is ended (Step SC10). On the other hand, when the printer control section 20 determines that the setting value read out in Step SC7 and the setting value indicating the communication request interval selected by the user are not the same (Step SC8: NO), the printer control section 20 controls the BLT control section 252 to set the setting value indicating the communication request interval selected by the user as the request interval setting item of the BLT setting file 253a (Step SC9). For example, when the communication request interval selected by the user is "15 ms", the printer control section 20 sets a setting value indicating "15 ms" as the request interval setting item of the BLT setting file 253a.

When the printer control section 20 sets the setting value indicating the communication request interval selected by the user as the request interval setting item of the BLT setting file 253a, the printer control section 20 determines that the initial processing is ended (Step SC10).

In this way, the printer control section 20 sets the setting value indicating the communication request interval selected by the user in the BLT setting file 253a. Thus, when the operation mode of the printer BLT communication section 25 is in the Sniff mode, the printer control section 20 can transmit the communication request at the communication request interval desired by the user. Thus, the printer control section 20 can suppress misunderstanding of the user due to the occurrence of a difference between the product to be read by the barcode scanner 5 and the product indicated by the product information displayed by the customer display 4.

In FIG. 7, an operation of setting the setting value in the initial processing performed after the reset of the printer 2 has been described. However, setting of the setting value may not be accompanied by the reset of the printer 2, or may not be performed in the initial processing.

As described above, the printer 2 (printing apparatus) includes: the printing section 26; the printer BLT communication section 25 (first communication section) capable of wireless communication with the POS terminal device 3 (control device, host computer); the printer device communication section 22 (second communication section) capable of communicating with the customer display 4 (external device); and the printer control section 20 (control section) which performs printing using the printing section 26 in accordance with print data (first data) when the printer BLT communication section 25 receives the print data from the POS terminal device 3 and transmits display data (second data) to the customer display 4 using the printer device communication section 22 when the printer device communication section 22 is connected to the customer display 4 and the printer BLT communication section 25 receives the display data from the POS terminal device 3. When a period during which the printer BLT communication section 25 does not receive the print data or the display data exceeds a shift period (predetermined period), the printer control section 20 shifts the operation mode of the printer BLT communication section 25 to the Sniff mode (power saving mode), temporarily stops wireless communication, and transmits a communication request to the POS terminal device 3 at a communication request interval (predetermined interval). Further, the printer control section 20 changes the communication request interval depending on whether or not the customer display 4 is connected to the printer device communication section 22.

According to this configuration, since the printer control section 20 changes the communication request interval depending on whether or not the customer display 4 is connected to the printer device communication section 22, it is possible to appropriately perform the power saving control and the control of the customer display 4 according to the connection of the customer display 4.

Further, the printer control section 20 sets the communication request interval when the customer display 4 is connected to the printer device communication section 22 shorter than the communication request interval when the customer display 4 is not connected.

According to this configuration, since the communication request interval when the customer display 4 is connected to the printer device communication section 22 is shorter than the communication request interval when the customer display 4 is not connected, the customer display 4 can be quickly controlled when the customer display 4 is connected, and it is possible to perform power saving control with emphasis on suppressing power consumption when the customer display 4 is not connected.

Further, the printer control section 20 changes the shift period for shifting to the Sniff mode depending on whether or not the customer display 4 is connected to the printer device communication section 22.

According to this configuration, since the shift period for shifting to the Sniff mode is changed depending on whether or not the customer display 4 is connected to the printer device communication section 22, it is possible to appropriately perform the power saving control and the control of the customer display 4 according to the connection of the customer display 4.

In addition, the printer control section 20 sets a shift period in which the customer display 4 is connected to the printer device communication section 22 longer than a shift period in which the customer display 4 is not connected to the printer device communication section 22.

According to this configuration, the shift period in which the customer display 4 shifts to the Sniff mode when the customer display 4 is connected to the printer device communication section 22 is longer than the shift period when the customer display 4 is not connected, so that when the customer display 4 is connected, quick control of the customer display 4 can be performed, and when the customer display 4 is not connected, it is possible to quickly shift to the power saving mode.

In addition, when the customer display 4 is connected to the printer device communication section 22, the printer control section 20 alternately performs printing based on the print data by the printing section 26 and the transmission of the display data by the printer device communication section 22.

According to this configuration, it is possible to suppress the occurrence of a delay in printing and display even when the printing based on the print data and the transmission of the display data are alternately performed and printing and display are performed every time the barcode scanner 5 performs reading. Therefore, the printer control section 20 can suppress the occurrence of a difference between the product to be read by the barcode scanner 5 and the product indicated by the product information printed and displayed.

Further, the POS terminal device 3 performs accounting processing. The customer display 4 is a display device for displaying accounting information (information relating to accounting). The print data is print data relating to issuance of receipt. The display data is display data including accounting information (also corresponding to product information) displayed by the customer display 4. When the printer BLT communication section 25 receives the print data from the POS terminal device 3, the printer control section 20 issues a receipt by the printing section 26. When the printer device communication section 22 is connected to the customer display 4 and the printer BLT communication section 25 receives the display data from the POS terminal device 3, the printer control section 20 transmits the accounting information (also corresponding to the product information) to the customer display 4 from the printer device communication section 22 for displaying.

According to this configuration, when the customer display 4 is connected, the printer control section 20 can suppress the occurrence of a difference between the product to be read by the barcode scanner 5 and the product indicated by the product information displayed by the customer display 4. Further, when the customer display 4 is not connected, the printer control section 20 can suppress unnecessary power consumption. Therefore, according to the connection of the customer display 4, the printer control section 20 can appropriately perform the power saving control and the display of the accounting information (also corresponding to product information) of the customer display 4.

Each of the above embodiments is merely one aspect of the invention, and can be modified and applied arbitrarily within the scope of the invention.

In the above-described embodiment, the setting value indicating the communication request interval stored in the setting value table 211 is exemplified as "250 ms" and "15 ms". However, the setting value indicating the communication request interval stored in the setting value table 211 is not limited to the setting value indicating the communication request interval, and may be, for example, "100 ms" and "10 ms". However, the setting value indicating the communication request interval stored in the setting value table 211 needs to be different from the viewpoint of making the communication request interval different. Also, the number of setting values indicating the communication request interval stored in the setting value table 211 is not limited to two, and the number in plurality may be sufficient. The same applies to a setting value indicating the shift period stored in the setting value table 211.

In addition, in the above-described embodiment, the POS terminal device 3 stores the product master 311. However, the product master 311 may be stored in an external server. In this case, the POS terminal control section 30 of the POS terminal device 3 transmits the product code received from the barcode scanner 5 to the server, and acquires the product information from the server.

Further, for example, in the case where the control method (control method of the printing control device (host computer)) of the printer 2 is realized by using a computer included in the printer 2, it is also possible to achieve the invention by the configuration in the mode of a program executed by a computer to realize the control method, a recording medium in which the program is recorded in a readable manner by the computer, or a transmission medium for transmitting the program. As the recording medium, a magnetic recording medium, an optical recording medium or a semiconductor memory device can be used. Specifically, a portable recording medium such as a flexible disk, a Hard Disk Drive (HDD), a Compact Disc (CD), a Digital Versatile Disc (DVD), a Blu-ray (registered trademark) Disc, a magneto-optical disk, a flash memory, a card type recording medium, or the like, or a fixed recording medium may be used. Further, the recording medium may be a non-volatile storage device such as a Random Access Memory (RAM), a Read Only Memory (ROM), an HDD, or the like, which is an internal storage device included in the printer 2.

Further, for example, processing unit of FIG. 3, FIG. 6, and FIG. 7 is given by being divided according to the main processing content in order to facilitate understanding of the processing of the printer 2, and the invention is not limited regardless of the method and name of division of the processing unit. The processing of the printer 2 may further be divided into many processing units according to the processing contents. Also, the processing may be divided such that one processing unit may further include larger number of processing.

Further, each of the functional sections shown in FIG. 1 shows a functional configuration, and a specific embodiment is not particularly limited. In other words, it is not necessarily necessary to implement hardware individually corresponding to each functional section, and a configuration may also be adopted in which the functions of a plurality of functional sections are realized by a program executed using one processor. In addition, a part of the functions realized by software in the above-described embodiment may be realized by hardware, or a part of the functions realized by hardware may be realized by software. In addition, specific detailed constructions of the printer 2 and the other sections of the POS terminal device 3 may be arbitrarily changed without departing from the scope of the invention.

Also, for example, the printer 2 may be a portable mobile printer that is provided with a battery and is portable by a user. In this case, since the power saving can be appropriately controlled, it is possible to reduce the frequency of the running-out of the battery included in the printer 2.

Further, for example, in the above-described embodiment, the printer 2 has been exemplified as a thermal printer including the line thermal head 261. However, the printer 2 is not limited to a thermal type, and the invention can be applied to an ink-jet type or the like.

What is claimed is:

1. A printing apparatus comprising:
   a printing mechanism;
   a first communicator configured to wirelessly communicate with a computer connected to a scanner;
   a second communicator configured to communicate with an external device; and
   a processor configured to:
      receive first data from the computer via the first communicator, receive second data from the computer via the first communicator, and receive, subsequent to receiving the second data, third data from the computer corresponding to data scanned by the scanner via the first communicator;
      responsive to the first communicator receiving the first data from the computer, print using the printing mechanism in accordance with the first data;
      responsive to the first communicator receiving the second data from the computer, transmit the second data to the external device using the second communicator, prior to the first communicator receiving the third data;
      responsive to a period during which the first communicator does not receive the first data or the second data for a period that exceeds a predetermined period, stop wireless communication by shifting an operation mode of the first communicator to a power saving mode in which the first communicator transmits communication requests to the computer at a predetermined interval; and
   set the predetermined interval based on whether or not the external device is connected to the second communicator.

2. The printing apparatus according to claim 1,
   wherein the processor is configured to set the predetermined interval when the external device is connected to the second communicator to a first predetermined interval shorter than a second predetermined interval that the processor is configured to set when the external device is not connected.

3. The printing apparatus according to claim 1,
   wherein the processor is configured to set the predetermined period and shift to the power saving mode depending on whether or not the external device is connected to the second communicator.

4. The printing apparatus according to claim 3,
   wherein the processor is configured to set the predetermined period when the external device is connected to the second communicator to a first predetermined period longer than a second predetermined period that the processor is configured to set when the external device is not connected to the second communicator.

5. The printing apparatus according to claim 1,
   wherein when the external device is connected to the second communicator, the processor is configured to alternately perform printing by the printing mechanism based on the first data and transmission of the second data by the second communicator.

6. The printing apparatus according to claim 1,
   wherein the computer is a POS terminal for performing accounting processing;
   the external device is a display for displaying information relating to accounting;
   the first data is print data relating to issuance of receipt;
   the second data is display data including information relating to the accounting displayed by the display; and
   the processor is configured to issue a receipt using the printing mechanism when the first communicator receives the print data from the POS terminal, and transmit information relating to the accounting to the display for display from the second communicator when the first communicator receives display data from the POS terminal.

7. A control method of a printing apparatus including a printing mechanism, a first communicator configured to wirelessly communicate with a computer connected to a scanner, and a second communicator configured to communicate with an external device, the control method comprising:
   receiving first data from the computer via the first communicator, receiving second data from the computer via the first communicator, and receiving via the first communicator, subsequent to receiving the second data, third data from the computer corresponding to data scanned by the scanner;
   responsive to the first communicator receiving the first data from the computer, printing using the printing mechanism in accordance with the first data;
   responsive to the first communicator receiving the second data from the computer, transmitting the second data to the external device using the second communicator, prior to the first communicator receiving the third data;
   responsive to a period during which the first communicator does not receive the first data or the second data for a period that exceeds a predetermined period, stopping wireless communication by shifting an operation mode of the first communicator to a power saving mode in which the first communicator transmits communication requests to the computer at a predetermined interval; and
   setting the predetermined interval based on whether or not the external device is connected to the second communicator.

8. The method according to claim 7, further comprising setting the predetermined interval when the external device is connected to the second communicator to a first predetermined interval shorter than a second predetermined interval that the printing apparatus is configured to set when the external device is not connected.

9. The method according to claim 7, further comprising setting the predetermined period and shifting to the power saving mode when the external device is connected to the second communicator.

10. The method according to claim 9, further comprising setting the predetermined period when the external device is connected to the second communicator to a first predetermined period longer than a second predetermined period that the printing apparatus is configured to set when the external device is not connected to the second communicator.

11. The method according to claim 7, further comprising alternately printing by the printing mechanism based on the first data and transmission of the second data by the second communicator when the external device is connected to the second communicator.

12. The method according to claim 7, wherein the computer is a POS terminal for performing accounting processing, the external device is a display for displaying information relating to accounting, the first data is print data relating to issuance of receipt, and the second data is display data including information relating to the accounting displayed by the display, the method comprising:

issuing a receipt using the printing mechanism when the first communicator receives the print data from the POS terminal, and transmitting information relating to the accounting to the display for display via the second communicator when the first communicator receives display data from the POS terminal.

\* \* \* \* \*